United States Patent
Lupton et al.

(10) Patent No.: US 7,537,702 B2
(45) Date of Patent: May 26, 2009

(54) WATER PURIFICATION SYSTEM AND MODES OF OPERATION

(75) Inventors: Francis S. Lupton, Evanston, IL (US); Russ Johnson, Elmhurst, IL (US); Peter M. Michalakos, Chicago, IL (US); Michel A. Jonqueres, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 822 days.

(21) Appl. No.: 11/103,972

(22) Filed: Apr. 12, 2005

(65) Prior Publication Data

US 2006/0226081 A1   Oct. 12, 2006

(51) Int. Cl.
*B01D 61/00* (2006.01)
*B01D 63/00* (2006.01)
*B01D 15/00* (2006.01)

(52) U.S. Cl. .................. 210/652; 210/660; 210/661; 210/195.2; 210/257.2; 210/758; 210/175; 55/527; 95/287

(58) Field of Classification Search .............. 210/652, 210/660–661, 262, 195.2, 195.1, 257.2, 762, 210/758, 760, 903, 175, 76; 202/155; 159/18, 159/28.6; 55/527; 95/287, 39; 60/309
See application file for complete search history.

(56) References Cited

U.S. PATENT DOCUMENTS

| | | | |
|---|---|---|---|
| 4,699,720 A * | 10/1987 | Harada et al. | 210/762 |
| 5,885,925 A | 3/1999 | DeFilippi et al. | |
| 6,136,186 A | 10/2000 | Gonzalez-Martin et al. | |
| 6,268,307 B1 | 7/2001 | DeFilippi et al. | |
| 6,419,837 B1 | 7/2002 | Akse | |
| 6,423,236 B1 * | 7/2002 | Shiota et al. | 210/761 |
| 6,623,603 B1 * | 9/2003 | Call et al. | 202/155 |
| 6,824,695 B2 * | 11/2004 | Tempest, Jr. | 210/760 |
| 7,132,086 B2 * | 11/2006 | Michalakos et al. | 422/169 |
| 7,389,639 B2 * | 6/2008 | Michalakos et al. | 60/309 |
| 7,390,343 B2 * | 6/2008 | Tepper et al. | 55/527 |
| 2004/0168989 A1 | 9/2004 | Tempest, Jr. | |
| 2004/0182791 A1 | 9/2004 | Kuhn et al. | |
| 2004/0258597 A1 | 12/2004 | Michalakos et al. | |

* cited by examiner

*Primary Examiner*—Ana M Fortuna
(74) *Attorney, Agent, or Firm*—Oral Caglar, Esq.

(57) ABSTRACT

A water purification system comprising a thermal hydrolysis catalytic reactor, an adsorbent media bed and a reverse osmosis unit is provided. The water purification system may provide potable water from non-potable water, such as non-potable water contaminated with chemical warfare agents, biological warfare agents, radioactive agents and/or Toxic Industrial Chemicals (TICs). Methods for providing potable water using the water purification system of the present invention are also provided.

44 Claims, 7 Drawing Sheets

WATER PURIFICATION SYSTEM AND MODES OF OPERATION

BACKGROUND OF THE INVENTION

The present invention generally relates to a water purification system and methods for providing potable water from contaminated water. More specifically, the present invention relates to a water purification system comprising a catalytic reactor, adsorbent and reverse osmosis units for providing potable water from water contaminated with chemical, biological, radiological and Toxic Industrial Chemicals (TICs) contaminants.

Water covers more than two-thirds of the Earth's surface. Nevertheless, there are many areas where water is scarce or where water, if available, is not potable and not suitable for human consumption. Obtaining sufficient quantities of potable water may be particularly problematic during military conflicts when it is necessary to provide potable water to troops in the field. During warfare, untreated water is potentially contaminated with a variety of toxic species, including chemical warfare agents such as sarin, mustard gas, phosgene, and cyanogens chloride. In addition, water may contain biological warfare agents such as anthrax or other biological toxins, including salmonella, hepatitis, small pox, and Norwalk virus and or radioactive agents. Water may also be contaminated with infectious agents emanating from poor local hygiene or sewage contamination as well as chemical pollutants from industrial and domestic sources. A water purification system that is both portable and highly efficient is desirable under such conditions.

Various water purification systems have been developed for purifying contaminated water, particularly water contaminated by chemical and/or biological warfare agents as well as radioactive agents. U.S. Pat. Nos. 4,699,720 and 6,423,236 both describe processes for water purification comprising catalytic thermal oxidation of chemical and/or biological warfare agents in the presence of an oxidizing agent and under high pressure and temperature. Reverse osmosis is used for further purification of water after the oxidation step. While these processes may be effective for providing potable water free of chemical and/or biological warfare agents, they are not effective for removal of radioactive agents. Reverse osmosis may provide 90-99% removal of radioactive agents, but this may not be sufficient to provide safe, potable water. Furthermore, any water purification system using these processes would have to provide both an oxidant for the catalytic thermal oxidation of chemical agents as well as the high temperatures and pressures required.

U.S. Published Application No. 2004/0168989 describes a system and method for water purification comprising non-thermal chemical oxidation where electrochemical generation of ozone is used to both oxidize chemical agents and kill biological agents. A major drawback to the system is that an additional unit is required to generate the ozone as well as subsequent removal of the ozone, in this case by UV irradiation. The system further comprises reverse osmosis and non-specific ion exchange for removal of radioactive agents. As with other systems in the prior art, there is some concern as to how effectively harmful radioactive agents are removed from the water.

As can be seen, there is a need for an efficient water purification system for removing chemical, biological and radioactive warfare agents from contaminated water to provide potable water. The water purification system should be highly efficient and portable. It would be desirable to have a system that is suitable for use during military conflicts.

SUMMARY OF THE INVENTION

In one aspect of the present invention there is provided a water purification system comprising a non-potable water reservoir; a heater, the heater being in fluid communication with the non-potable water reservoir; a thermal hydrolysis catalytic reactor, the thermal hydrolysis catalytic reactor comprising a hydrolysis catalyst and wherein the thermal hydrolysis catalytic reactor is in fluid communication with the heater; an adsorbent media bed, the adsorbent media bed comprising an adsorbent for adsorbing radionuclides and wherein the adsorbent media bed is in fluid communication with the thermal hydrolysis catalytic reactor; a reverse osmosis unit, the reverse osmosis unit being in fluid communication with the adsorbent media bed; and a potable water reservoir, the potable water reservoir being in fluid communication with the adsorbent media bed.

In another aspect of the present invention there is provided a water purification system comprising a non-potable water reservoir; a low pressure pump, the low pressure pump being in fluid communication with the non-potable water reservoir; a heater, the heater being in fluid communication with the reservoir; a thermal hydrolysis catalytic reactor, the thermal hydrolysis catalytic reactor comprising a hydrolysis catalyst and wherein the thermal hydrolysis catalytic reactor is in fluid communication with the heater; an adsorbent media bed, the adsorbent media bed comprising an adsorbent for adsorbing radionuclides and wherein the adsorbent media bed is in fluid communication with the thermal hydrolysis catalytic reactor; a high pressure pump, the high pressure pump being in fluid communication with the adsorbent media bed; a reverse osmosis unit, the reverse osmosis unit being in fluid communication with the high pressure pump; and a potable water reservoir, the potable water reservoir being in fluid communication with the reverse osmosis unit.

In a further aspect of the invention there is provided a water purification system comprising a non-potable water reservoir, the non-potable reservoir comprising an internal expandable bladder and a decontaminated water reservoir; a low-pressure pump, the low-pressure pump being in fluid communication with the expandable bladder of the non-potable water reservoir; a recuperator, the recuperator being in liquid communication with the expandable bladder of the non-potable water reservoir; a heater, the heater being in fluid communication with the recuperator; a thermal hydrolysis catalytic reactor, the thermal hydrolysis catalytic reactor comprising a hydrolysis catalyst and wherein the thermal hydrolysis catalytic reactor is in fluid communication with the heater and the recuperator; an adsorbent media bed, the adsorbent media bed comprising a sodium titanate or silicotitanate adsorbent and wherein the adsorbent media bed is in fluid communication with the recuperator and the decontaminated water reservoir of the non-potable water reservoir; a high pressure pump, the high pressure pump being in fluid communication with the non-potable water reservoir; a reverse osmosis unit, the reverse osmosis unit being in fluid communication with the adsorbent media bed and the non-potable water reservoir; a potable water reservoir, the potable water reservoir being in fluid communication with the adsorbent media bed; and a disinfectant dispenser, the disinfectant dispenser being in fluid communication with the potable water reservoir.

In yet another aspect of the invention there is provided a water generation and purification system comprising a gas stream production unit; a water separation unit, the water separation unit disposed downstream from the gas stream production unit; and a water purification unit, the water purification unit comprising a non-potable water reservoir, a heater, the heater being in fluid communication with the reservoir, a thermal hydrolysis catalytic reactor, the thermal hydrolysis catalytic reactor comprising a hydrolysis catalyst and wherein the thermal hydrolysis catalytic reactor is in fluid communication with the heater, an adsorbent media bed, the adsorbent media bed comprising an adsorbent for adsorbing radionuclides and wherein the adsorbent media bed is in fluid communication with the thermal hydrolysis catalytic reactor, and a reverse osmosis unit, the reverse osmosis unit being in fluid communication with the adsorbent media bed and a potable water reservoir, the potable water reservoir being in fluid communication with the adsorbent media bed.

In a further aspect of the invention there is provided a method for providing potable water comprising the steps of providing a source of non-potable water, wherein the non-potable water contains one or more chemical contaminants; heating the non-potable water to a temperature of at least about 125° C.; hydrolyzing the chemical contaminants by passing the heated water through a thermal hydrolysis catalytic reactor; cooling the water to less than about 100° F.; removing radionuclide contaminants by flowing the water through an adsorbent media bed; and pumping the water through a reverse osmosis filter to provide the potable water.

In another aspect of the present invention there is provided a method for providing potable water comprising the steps of providing a source of non-potable water containing chemical contaminants; storing the water in an expandable bladder of a non-potable water reservoir; pumping the non-potable water under low pressure from non-potable water reservoir; heating the non-potable water to a temperature of from about 125° C. to about 200° C.; hydrolyzing chemical contaminants in the non-potable water by passing the heated water through a thermal hydrolysis catalytic reactor; cooling the water to less than about 100° F.; removing radionuclide contaminants by flowing the water through an adsorbent media bed, thereby producing decontaminated water; storing the decontaminated water in a decontaminated water reservoir of the non-potable water reservoir, wherein the decontaminated water reservoir is outside of the expandable bladder; pumping the decontaminated water under high pressure through a reverse osmosis filter to provide the potable water; and storing the potable water in a reservoir.

These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides water purification systems and methods for producing potable water from non-potable water, including water contaminated with chemical, biological, and/or radioactive agents as well as TICs. The water purification system may comprise a catalytic reactor for thermal hydrolysis of chemical and/or biological agents, an adsorbent media bed for removal of radionuclides and a reverse osmosis unit for removal of salts, metals and other contaminants. The water purification system may also comprise a non-potable water reservoir with an expandable bladder. The non-potable water may be stored in the bladder and decontaminated water may be stored in the reservoir in the space outside the bladder. The water purification system may further comprise a heater for heating the non-potable water before entering the catalytic reactor and low and high pressure pumps for pumping water through the system. Non-potable water may be obtained from surface sources such as streams or lakes, it may be stored in the non-potable water reservoir or it may be obtained from a gas stream such as the hot exhaust gas from an engine. The water purification system of the present invention may be designed to be portable so that it may be mounted in a land vehicle. The water purification system may be used, for example, by military personnel, particularly during times of conflict.

The efficiency of production of potable water by the water purification system of the present invention may be due to the use of a combination of a thermal hydrolysis catalytic reactor, an adsorbent media bed, and a reverse osmosis unit. The thermal hydrolysis catalytic reactor may comprise a hydrolysis catalyst which effectively hydrolyses chemical warfare agents, rendering them harmless and thermally deactivates live biological agents and bio-toxins. Unlike water purification systems of the prior art, which use oxidative processes to breakdown chemical agents, the thermal hydrolysis catalytic reactor of the present invention does not require any additional agents, such as air, oxygen or ozone. Moreover, in the present invention there is also no need for removal of oxidative by-products. The only requirement is preheating of the non-potable water which is readily accomplished by a simple heating unit. The adsorbent media bed may comprise an adsorbent, such as sodium titanate or silicotitanate, which may effectively and selectively remove about 99.99% of radionuclide contaminants, particularly cesium and strontium. In comparison, water purification systems of the prior art use either reverse osmosis or non-selective ion exchange for removal of radionuclides. These methods have a lower efficiency and can provide only about 90-99% removal, or less, of radionuclides.

Figure 1:
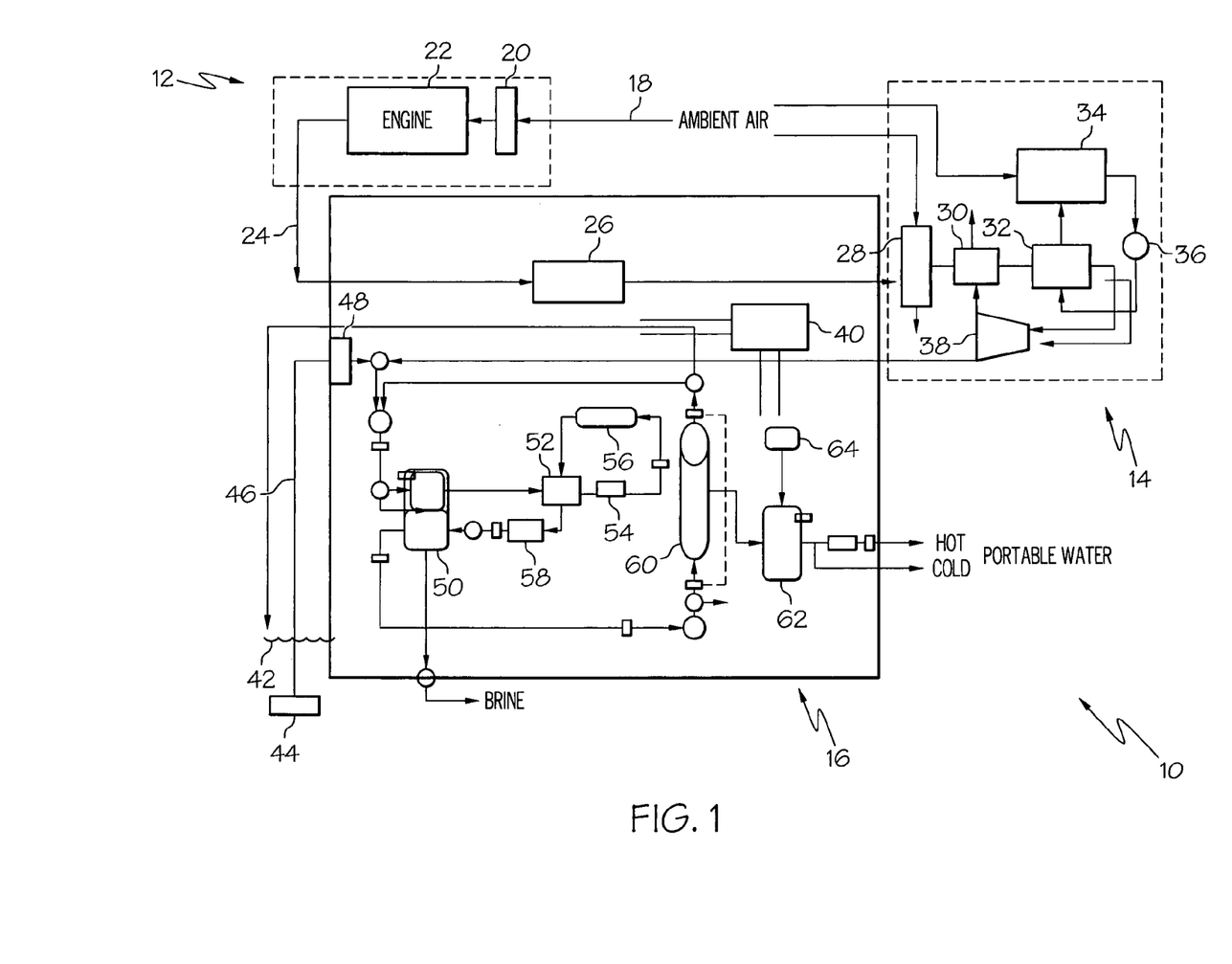
FIG. 1 is a schematic showing a general water generation and purification system, according to the present invention.

Illustrated in FIG. 1 is a water generation and purification system 10 comprising a gas stream production unit 12, a water generation system 14, and a water purification system 16. Water generation and purification system 10 may be used to purify non-potable water from either a gas stream, as illustrated by hot engine exhaust gas 24, and/or from a surface, non-potable water source 42, such as, but not limited to, streams, rivers, ponds and wells. Gas stream production unit 12 may comprise a particulate filter 20, an engine 22 and a catalytic particulate filter 26. Engine 22 may be any engine that produces an exhaust gas stream 24 such as, by way of non-limiting example, a gas turbine engine or a piston driven engine such as a diesel engine or a gasoline engine. Water generation system 14 may comprise a precooler 28, a first recuperator 30 for further cooling gas stream 24, a condenser 32, a refrigeration unit 34 for cooling condenser 32 and a water separator 38 for obtaining condensed water from the chilled gas stream 24. Refrigeration unit 34 may comprise a vapor cycle system, an air cycle system, an ambient air cooling system, a cooling tower or an absorption cooling system. The water obtained may then go to water purification system 16.

Water purification system 16 may be part of water generation and purification system 10 or it may operate as a stand-alone unit, obtaining non-potable water from other sources. As illustrated in FIG. 1, non-potable water may be obtained from a surface non-potable water source 42. The non-potable water may enter water purification system 16 via hose 46; first passing through filter screen 44 and then inlet filter 48 to remove particulate matter. The non-potable water may be stored in non-potable water reservoir 50 or it may be pumped directly from surface non-potable water source 42 to thermal hydrolysis catalytic reactor 56. Water purification system 16 may further comprise a second recuperator 52, a heater 54, thermal hydrolysis catalytic reactor 56, an adsorbent media bed 58, a reverse osmosis unit 60 and a potable water reservoir 62. A disinfectant dispenser 64 may be connected to potable water reservoir 62. Water purification system 16 may also be controlled using an external controller 40.

Figure 2:
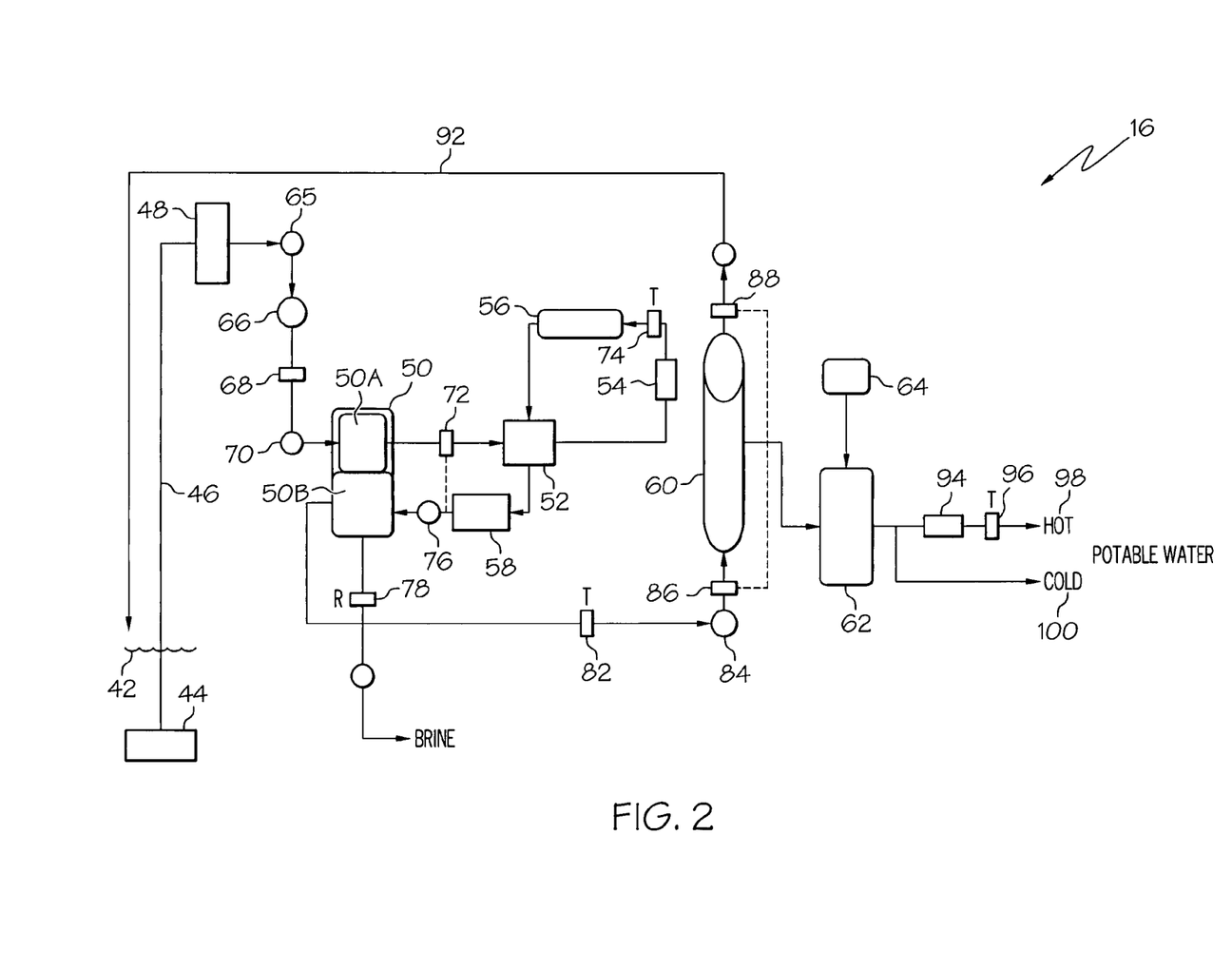
FIG. 2 is a schematic showing a water purification system for purifying water from an external water source, according to the present invention.

Water purification system 16 is more fully illustrated in FIGS. 2 and 4-6, each figure illustrating a different mode of operation for water purification system 16. FIG. 2 illustrates one mode of operation of water purification system 16 where water purification system 16 operates using surface non-potable water source 42. The non-potable water may be pumped through filter screen 44 and then inlet filter 48 via hose 46 to remove suspended solids in the water by low pressure pump 66. In an illustrative embodiment, filter screen 44 may have a mesh of from about 1 mm to about 3 mm while inlet filter may have a mesh of from about 5 µm to about 50 µm. The flow of non-potable water into water purification system 16 is controlled by a first three-way valve 65. First three-way valve 65 allows flow of non-potable water from surface non-potable water source 42 and/or from water generation system 14 (see FIG. 1). The low pressure of the non-potable water may be sufficient to drive the non-potable water through thermal hydrolysis catalytic reactor 56 and adsorbent media bed 58. In one illustrative embodiment, the low pressure is from about 40 psi to about 80 psi while in a second illustrative embodiment, the low pressure is from about 40 psi to about 50 psi. The pressure of the flow of non-potable water may be monitored by a first pressure sensor 68. A second three-way valve 70 may be adjusted to allow the non-potable water to be stored in non-potable water reservoir 50 or to go directly to thermal hydrolysis catalytic reactor 56.

Figure 3A:
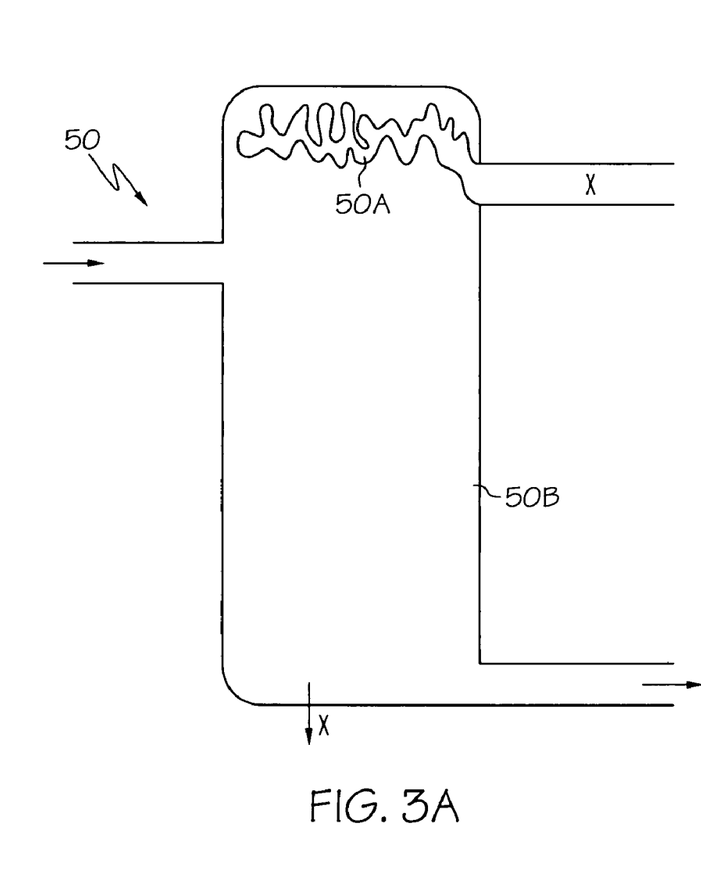
FIG. 3A is a cross-sectional view of a non-potable water reservoir with an expandable bladder showing the expandable bladder in the collapsed state, according to the present invention.
Figure 3B:
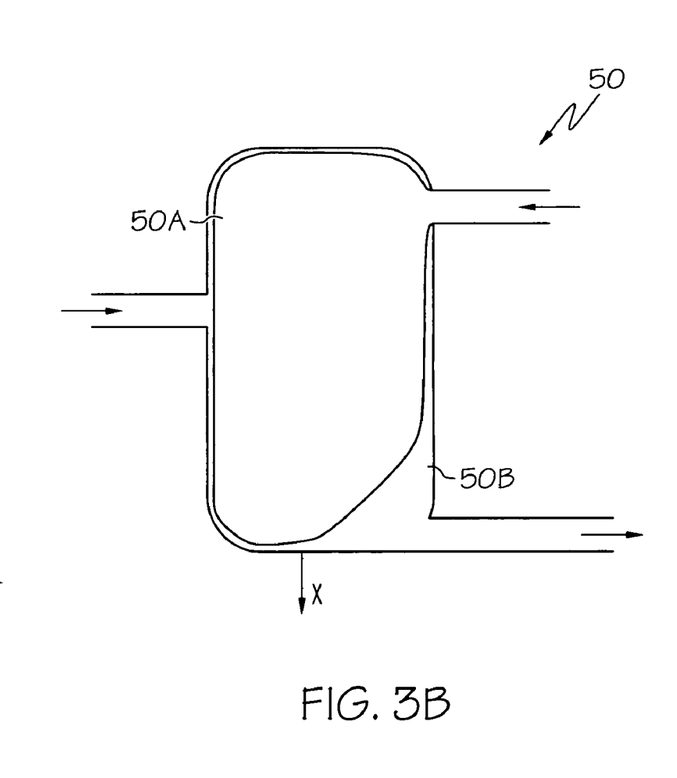
FIG. 3B is a cross-sectional view of a non-potable water reservoir with an expandable bladder showing the expandable bladder in the expanded state, according to the present invention.

Non-potable water reservoir 50 may be any container of suitable volume for the size of water purification system 16. In one illustrative embodiment, illustrated in FIGS. 3A and 3B, non-potable water reservoir 50 may comprise an expandable bladder 50A. FIG. 3A shows expandable bladder 50A in a collapsed state when empty while FIG. 3B shows expandable bladder 50A in an expanded state filled with non-potable water. Expandable bladder 50A may comprise any material suitable for holding water and having the flexibility and/or elasticity to expand when full and contract when empty. The area outside expandable bladder 50A may be a decontaminated water reservoir 50B to hold decontaminated water before being pumped into reverse osmosis unit 60.

Again with reference to FIG. 2, water purification system 16 may further comprise second recuperator 52 in fluid communication with non-potable water reservoir 50. Second recuperator 52 may be any device that preheats the non-potable water using the heat of the water from thermal hydrolysis catalytic reactor 56 to conserve energy used by the system. By way of non-limiting example, second recuperator 52 may be a cross-flow recuperator. Recuperator 52 may be in fluid communication with first heater 54. First heater 54 may be any heating element capable of heating the non-potable water to a temperature required for thermal hydrolysis catalytic reactor. In one illustrative embodiment, first heater 54 may be capable of heating the non-potable water to a temperature of at least about 125° C. (or about 250° F.) and in another illustrative embodiment, from about 125° C. to about 200° C. (about 250° F. to about 400° F.). In another illustrative embodiment, first heater 54 may comprise an electric resistive element. After being heated, the temperature of the heated non-potable water may be monitored by a first temperature sensor 74 wherein first temperature sensor 74 is downstream from heater 54 and upstream from thermal hydrolysis catalytic reactor 56.

Thermal hydrolysis catalytic reactor 56 may be in fluid communication with first heater 54. After the non-potable water is heated by first heater 54 it may flow through thermal hydrolysis catalytic reactor 56 where chemical agents such as, but not limited to, chemical warfare agents, may be hydrolyzed. It will be appreciated that complete degradation of the chemical agents may not be necessary to render them harmless to humans or other animals, but rather such agents may be rendered harmless, or less harmful, by hydrolytic cleavage of one or more key chemical bonds. Non-limiting examples of chemical warfare agents that may be neutralized by hydrolysis according to the present invention may include sarin, mustard gas, phosgene, cyanogens chloride and nerve agent VX. Thermal hydrolysis catalytic reactor 56 may comprise a hydrolysis catalyst. Such catalysts are well known in the field. In one illustrative embodiment, the hydrolysis catalyst may be a transition metal such as, but not limited to, iron, cobalt, nickel, or mixtures thereof. The transition metals may be in metallic form, oxide form, or a combination thereof. The transition metals may also be unsupported or may be distributed on a support comprising carbon, alumina, silica, zeolite, or other materials not soluble in water. In an alternative embodiment, the hydrolysis catalyst may be a noble metal such as, but not limited to, platinum, palladium or mixtures thereof, either alone or in combination with other metals. The noble metals may be on a support where the support may comprise carbon, alumina, silica, zeolite, or other material not soluble in water. Biological agents, viral, bacterial and bio-toxins, may also be degraded by the high temperature of the sample and/or by hydrolysis as well. Non-limiting examples of biological warfare agents and diseases include ricin, anthrax, small pox, plague, and viral hemorrhagic fevers.

After thermal hydrolysis, the non-potable water may pass from thermal hydrolysis catalytic reactor 56 back through second recuperator 52 to cool the non-potable water before passing through adsorbent media bed 58. The non-potable water may be cooled to a temperature optimal for adsorbent media bed 58. In an illustrative embodiment, when the adsorbent media is sodium titanate or silicotitanate the non-potable water may be cooled to a temperature of less than about 100° F. (about 38° C.). Adsorbent media bed 58, which may be in fluid communication with thermal hydrolysis catalytic reactor 56, may comprise an adsorbent media for removing radionuclides such as, but not limited to, nuclides of cesium and strontium. In one illustrative embodiment, the media may comprise sodium titanate and/or silicotitanate. In another illustrative embodiment, the media may comprise an ion exchange composition of sodium titanate as disclosed in commonly assigned U.S. Pat. Nos. 5,885,925 and 6,268,307, hereby incorporated by reference. It will also be appreciated that conventional ion exchange resins known to adsorb radionuclides may also be used. Adsorbent media bed 58 may further comprise media for removing iodine and heavy metals such as arsenic or mercury.

The adsorbent media bed may be in direct fluid communication with non-potable water reservoir 50. The now decontaminated water may be stored in decontaminated water reservoir 50B before being pumped to reverse osmosis unit 60. Conductivity meter 78 may measure the salt concentration of the decontaminated water. Heavier brine will sink to the bottom of decontaminated water reservoir 50B and when the salt concentration reaches a certain level, valve 80 may be opened and the brine evacuated from the system. Alternatively, the decontaminated water may be pumped directly to reverse osmosis unit 60 by high pressure pump 84. The pressure of the decontaminated water should be such that reverse osmosis unit 60 will function properly and may be membrane dependent. In an illustrative embodiment, the high pressure may be from about 800 psi to about 1000 psi. The temperature of the decontaminated water may be monitored by second temperature sensor 82.

Reverse osmosis unit 60 may be in fluid communication with either non-potable water reservoir 50 or adsorbent media bed 58. Reverse osmosis unit 60 may comprise a reverse osmosis filter. Reverse osmosis filters are commercially available and well known in the art. Non-limiting examples of commercially available reverse osmosis filters are FilmTec™ SW30-2540, Hydranautics SWC1-2540, Koch TFC® 2540 SW HF or Toray TM 810. The pressure across reverse osmosis unit 60 may be monitored by a second pressure sensor 86 on the inlet side of reverse osmosis unit 60 and a second differential pressure sensor on the outlet side of reverse osmosis unit 60. The pressure differential across reverse osmosis unit 60 and the reverse osmosis filter may indicate the condition of the reverse osmosis filter. As salts and other chemicals become trapped by the reverse osmosis filter, the pressure may increase and eventually the filter may be replaced. As the decontaminated water is pumped through reverse osmosis unit 60 the decontaminated water may be split into two streams. The retentate stream, which does not pass through the reverse osmosis filter, may be returned to surface non-potable water source 42 through retentate return line 92. The permeate stream of potable water, filtered of salts and remaining chemicals, may be sent to potable water reservoir 62 to be stored until needed. Disinfectant dispenser 64 may be in fluid communication with potable water reservoir 62. Disinfectant dispenser 64 may discharge disinfectant to the potable water in potable water reservoir 62 to prevent microbe growth and contamination. In an illustrative embodiment, the disinfectant may be iodine, hydrogen peroxide or hypochlorite. In an alternative illustrative embodiment, the disinfectant dispenser may be capable of in situ generation of hydrogen peroxide by known means, such as electrochemical processes. With in situ generation of hydrogen peroxide, the level of disinfectant may not need to be monitored and replenished.

When potable water is needed, it may be accessed by hot 98 and cold 100 water lines. The hot water line 98 may comprise a second heater 94 and third temperature monitor 96 for providing the hot water.

Figure 4:
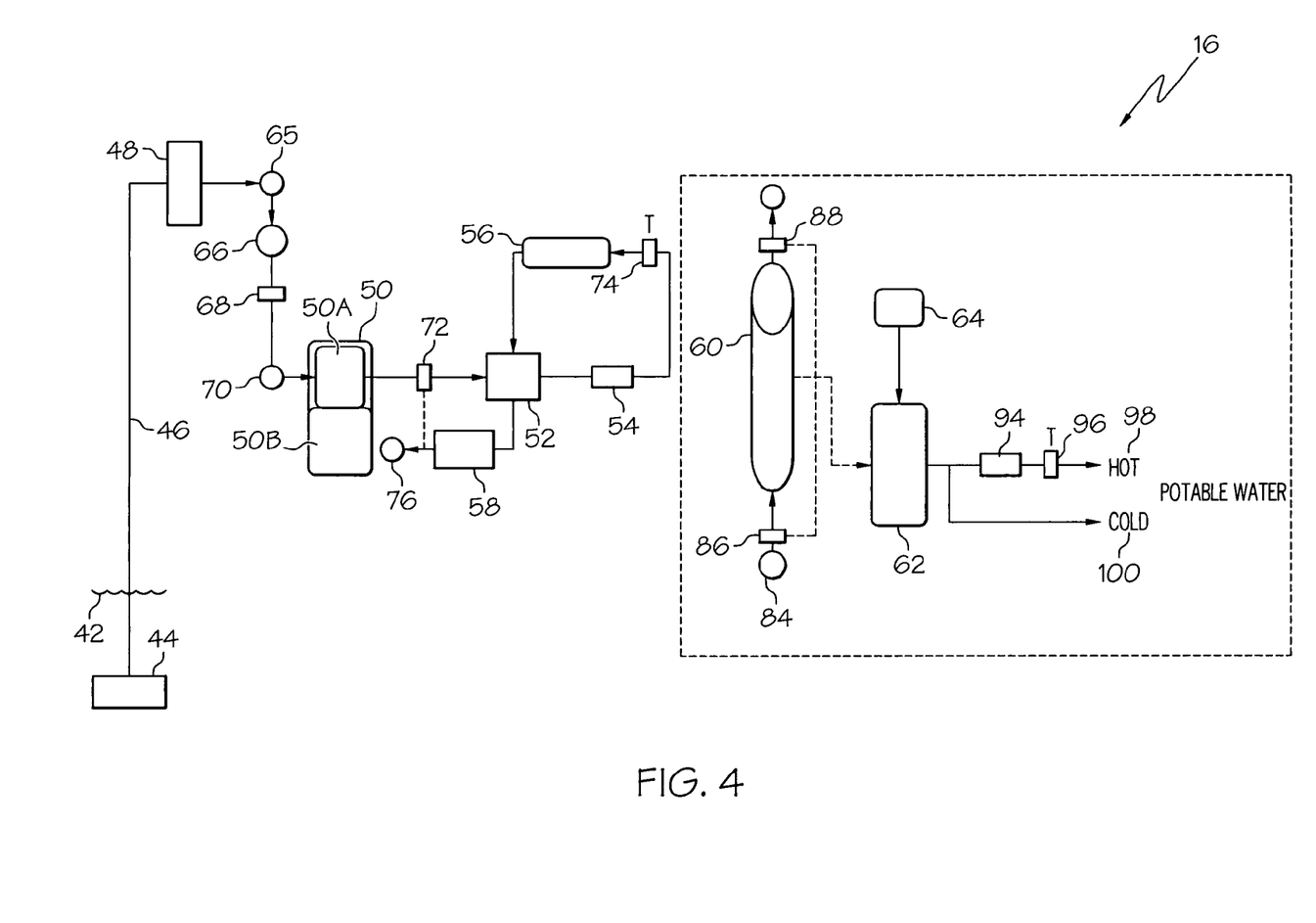
FIG. 4 is a schematic showing a water purification system for storage and decontamination of water, according to another embodiment of the present invention.

Shown in FIG. 4 is an alternate mode of operation for water purification system 16. In this mode, there may be a rapid uptake of a limited amount of water from surface non-potable water source 42. It is contemplated that in this mode there may be minimal power available for water purification. A possible scenario may be during military combat situations, where a limited amount of water may be taken up. Water purification system 16 may be mounted on a vehicle where the vehicle provides power for water purification system 16. During combat situations there may be a premium on power for combat systems so minimal power may be available for water purification. Non-potable water may be taken up from surface non-potable water source 42 and pumped through filter screen 44 and via hose 46, through inlet filter 48. The non-potable water may then be stored in expandable bladder 50A of non-potable water reservoir 50. With minimal power, the non-potable water may be pre-heated in second recuperator 52 and heated by first heater 54 before the non-potable water passes through thermal hydrolysis catalytic reactor 56. After being cooled in second recuperator 52, may be removed from the non-potable water by passing the non-potable water through adsorbent media bed 58. The now decontaminated water may be stored in decontaminated water reservoir 50B. No further water purification may be done and reverse osmosis unit 60 may be isolated and not operational. When full power is available for water purification system 16 the decontaminated water may then be purified through reverse osmosis unit 60, providing potable water.

Figure 5:
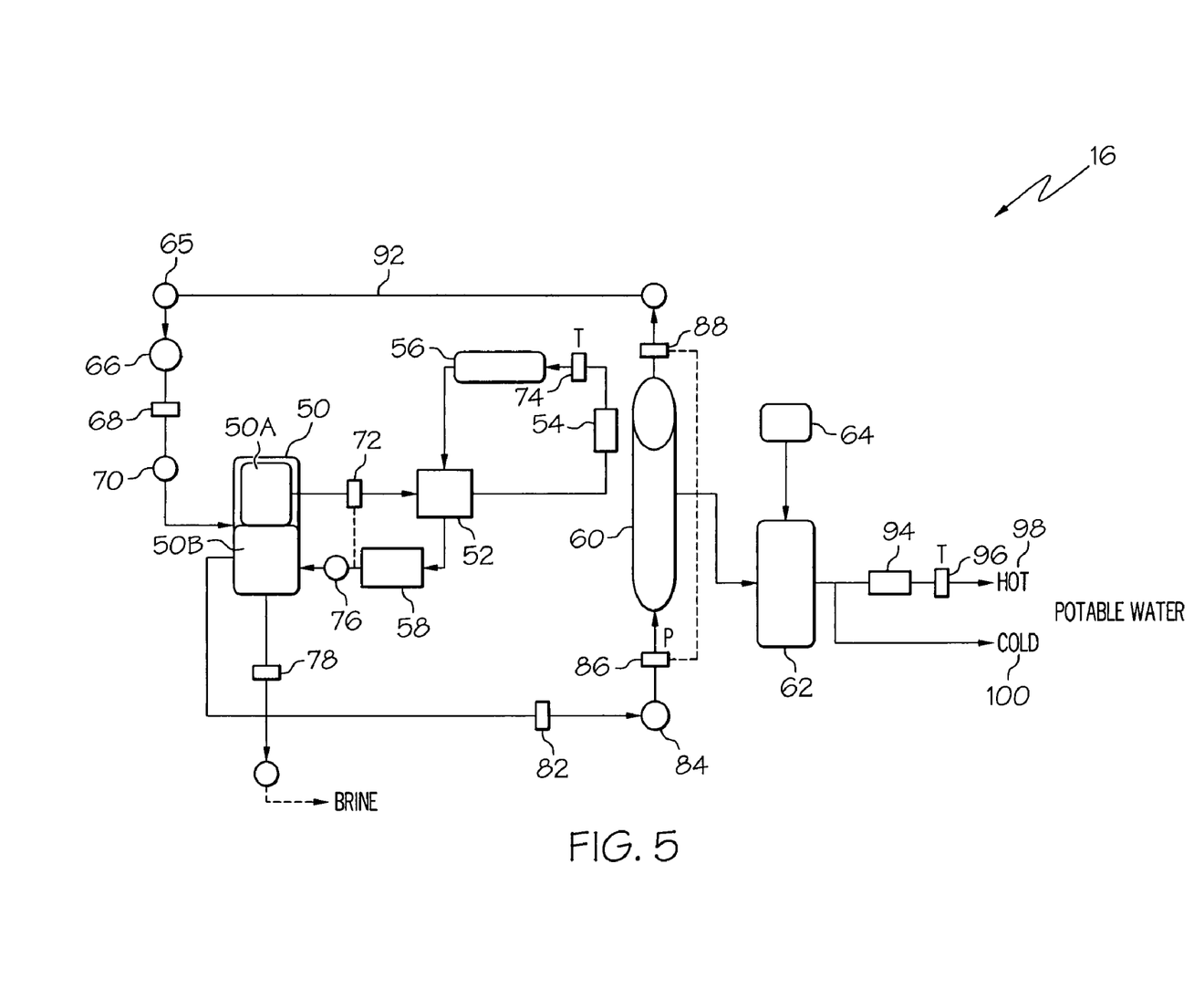
FIG. 5 is a schematic showing a water purification system for purification of decontaminated water, according to a further embodiment of the present invention.

FIG. 5 illustrates a further mode of operation for water purification system 16. In this scenario, there may be no surface non-potable water sources 42 available and non-potable water stored in the non-potable water bladder 50A may be used to produce potable water, or alternatively, stored decontaminated water may be used. When using stored non-potable water, the process may be the same as that illustrated in FIG. 2, with the exception that the retentate stream may be recycled back to decontaminated water reservoir 50B. Water purification system 16 may be operated until no more decontaminated water remains on the retentate side of reverse osmosis unit 60. Alternatively, if previously stored decontaminated water is used, only reverse osmosis unit 60 may need to be operated. Second recuperator 52, first heater 54, catalytic reactor 56 and adsorbent media bed 58 may not be required and may be isolated from the remainder of the water purification system 16 by closing hydrolysis loop isolation valve 76.

Figure 6:
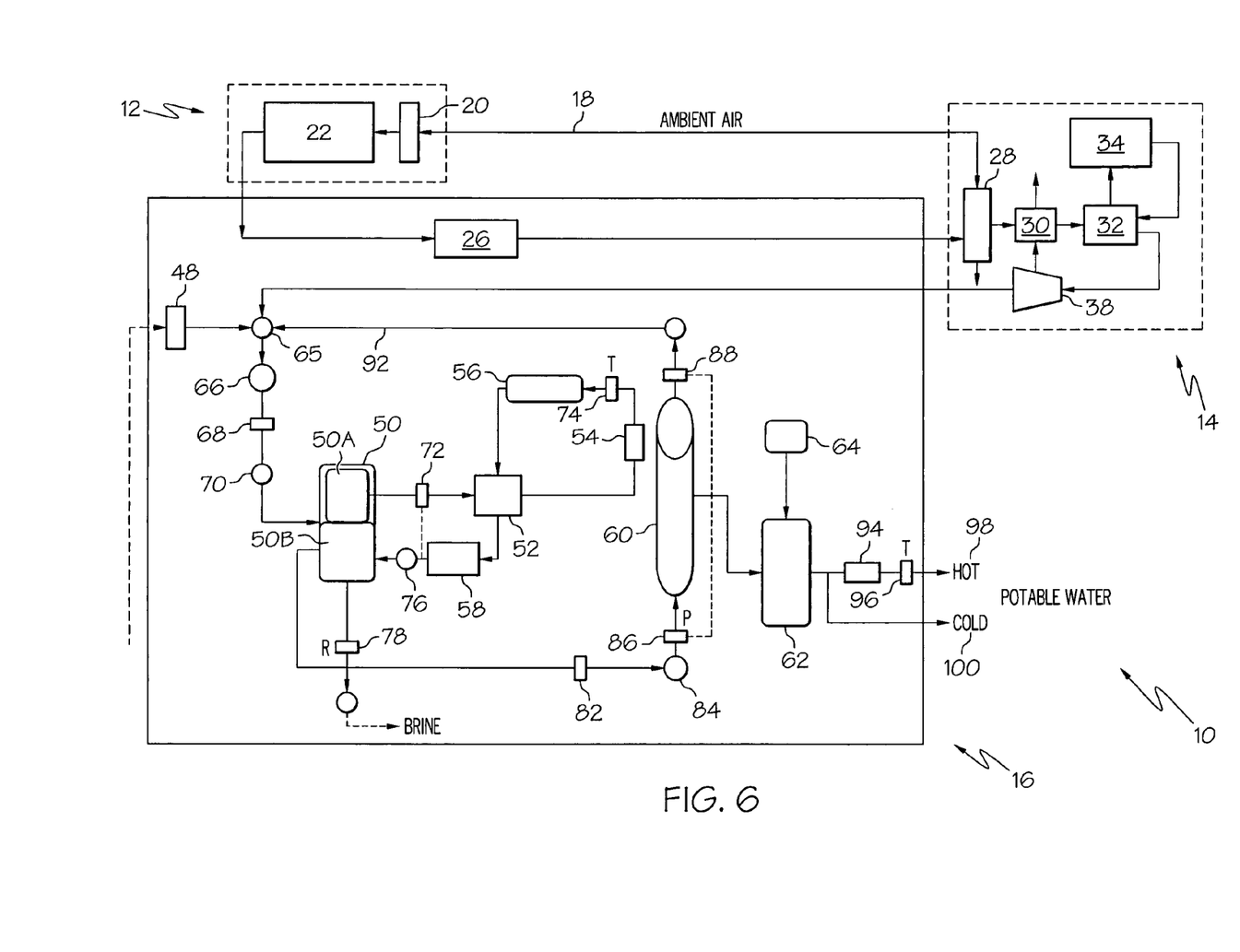
FIG. 6 is a schematic showing a water generation and purification system for obtaining water from engine exhaust, according to another embodiment of the present invention.

A mode of operation for water generation and purification system 16 is illustrated in FIG. 6. In this mode, surface non-potable water sources are not available and there may not be any stored non-potable or decontaminated water. Water may then be recovered from engine exhaust, e.g., as disclosed in commonly assigned co-pending U.S. patent application Ser. No. 10/870,569 (U.S. Published Patent Application No. 2004/0258597), hereby incorporated by reference. In general, hot exhaust gas stream 24 may be produced by gas stream production unit 12. Ambient air 18 may be filtered by particulate filter 20 to remove particulates. Air and fuel may then combust in engine 22 to form water as a by-product, which may be found in hot exhaust gas stream 24. Hot exhaust gas stream 24 may then pass through catalytic particulate filter 26 to remove particles and organic chemicals from any non-combusted fuel or non-combusted chemical or biological agents entering through the ambient air 18, before entering water generation system 14 downstream from gas production unit 12. Water generation system 14 may cool hot exhaust gas stream 24 using precooler 28, first recuperator 30, condenser 32 and refrigeration unit 34 to condense the water present as fine mist-like droplets. The water condensate may then be separated from gas stream 24 by water separator 38. The water condensate stream may then enter water purification system 16 and be stored in decontaminated water reservoir 50B. Particulate filter 20 and catalytic particulate filter 26 of gas stream production unit 12 may allow the condensate stream to bypass thermal hydrolysis catalyst reactor 56 and adsorbent media bed 58. The water condensate stream may then go to reverse osmosis unit 60 where the permeate stream may go to potable water reservoir 62 while the retentate water stream may be recycled to decontaminated reservoir 50B.

Figure 7:
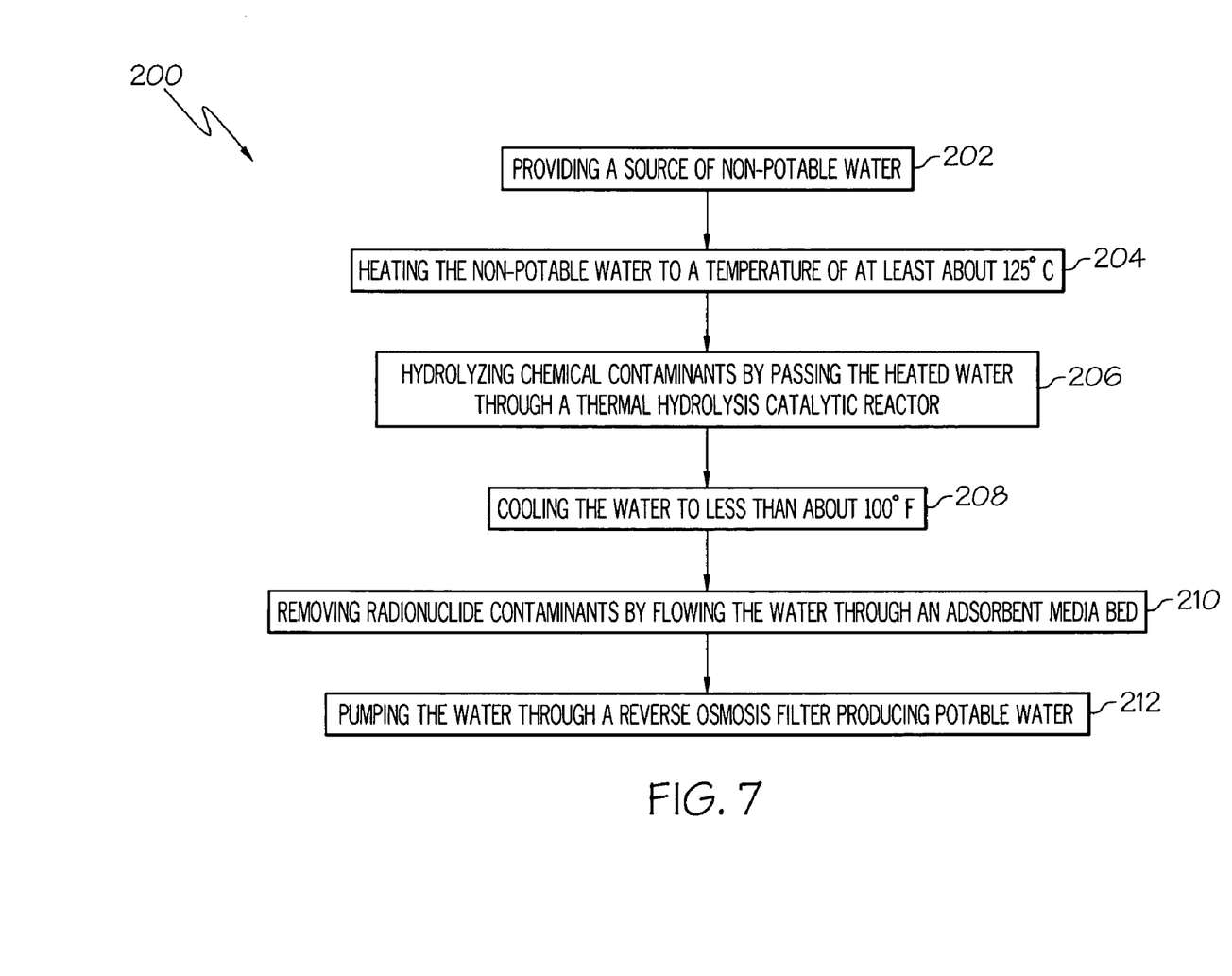
FIG. 7 is a flow-chart of a method for purification of non-potable water, according to the present invention.

The present invention also provides a method for providing potable water. Method 200, shown in FIG. 7, may comprise a step 202 of providing a source of non-potable water. In step 204, the non-potable water may be heated to a temperature of at least about 125° C. Step 206 may comprise hydrolyzing chemical contaminants present in the non-potable water by passing the heated water through a thermal hydrolysis catalytic reactor followed by step 208 of cooling the water to less than about 100° F. In step 210 contaminants may be removed by flowing the water through an adsorbent media bed. Finally, in step 212 the now decontaminated water may be pumped through a reverse osmosis filter producing potable water.

It should be understood, of course, that the foregoing relates to exemplary embodiments of the invention and that modifications may be made without departing from the spirit and scope of the invention as set forth in the following claims.

We claim:

1. A water purification system comprising:
   at least two inlets, each inlet being configured to receive non-potable water from different non-potable water sources;
   a thermal hydrolysis catalytic reactor, the thermal hydrolysis catalytic reactor comprising a hydrolysis catalyst configured to hydrolyze chemical and biological agents in said water, without addition of an oxidizing agent;
   an adsorbent media bed, the adsorbent media bed comprising an adsorbent for adsorbing radionuclides and wherein the adsorbent media bed is in fluid communication with the thermal hydrolysis catalytic reactor;
   a low pressure pump configured to pump non-potable water from said inlets through said thermal hydrolysis catalytic reactor and said adsorbent media bed;
   a reverse osmosis unit, the reverse osmosis unit being in fluid communication with the adsorbent media bed;
   a high pressure pump configured to pump water through said reverse osmosis unit;
   a recuperator configured to transfer heat from water treated in said thermal hydrolysis catalytic reactor to said non-potable water prior to entering said thermal hydrolysis catalytic reactor; and
   said water purification system being portable and configured to provide potable water from source water contaminated with chemical, biological, radiological, and toxic industrial chemicals.

2. The water purification system of claim 1 further comprising a heater, the heater being in fluid communication with the thermal hydrolysis catalytic reactor.

3. The water purification system of claim 2 wherein the heater comprises an electric resistive element.

4. The water purification system of claim 1 wherein the hydrolysis catalyst comprises an iron catalyst or a platinum catalyst.

5. The water purification system of claim 1 wherein the adsorbent comprises sodium titanate.

6. The water purification system of claim 1 further comprising a non-potable water reservoir, the non-potable water reservoir being in fluid communication with the thermal hydrolysis catalytic reactor.

7. The water purification system of claim 1 further comprising a potable water reservoir, the potable water reservoir being in fluid communication with the reverse osmosis unit.

8. A water purification system comprising:
   a non-potable water reservoir comprising an expandable bladder configured to provide flow of said non-potable water through a first portion of said water purification system;
   said first portion of said water purification system comprising;
      a heater in fluid communication with the non-potable water flowing from said non-potable water reservoir;
      a thermal hydrolysis catalytic reactor, the thermal hydrolysis catalytic reactor comprising a hydrolysis catalyst and wherein the thermal hydrolysis catalytic reactor is in fluid communication with the heater;
      a recuperator in fluid communication with the non-potable water reservoir and the thermal hydrolysis catalytic reactor configured for preheating non-potable water in the non-potable water reservoir by transferring heat from water treated in the thermal hydrolysis catalytic reactor;
      an adsorbent media bed, the adsorbent media bed comprising an adsorbent for adsorbing radionuclides and wherein the adsorbent media bed is in fluid communication with the thermal hydrolysis catalytic reactor;
      a decontaminated water reservoir in flow communication with said adsorbent media bed;
   said water purification system having a second portion comprising:
      a high pressure pump in flow communication with said decontaminated water reservoir;
      a reverse osmosis unit, the reverse osmosis unit being in fluid communication with the high pressure pump; and
      a potable water reservoir, the potable water reservoir being in fluid communication with the reverse osmosis unit.

9. The water purification system of claim 8 wherein the hydrolysis catalyst of the thermal hydrolysis catalytic reactor comprises a transition metal.

10. The water purification system of claim 9 wherein the transition metal comprises iron, cobalt, nickel, or mixtures thereof, alone or in combination with other metals or metal oxides.

11. The water purification system of claim 8 wherein the hydrolysis catalyst of the thermal hydrolysis catalytic reactor comprises a noble metal on a support.

12. The water purification system of claim 11 wherein the noble metal comprises platinum, palladium, or mixtures thereof, alone or in combination with other metals.

13. The water purification system of claim 11 wherein the support comprises carbon, alumina, silica, zeolite, or other material not soluble in water.

14. The water purification system of claim 8 wherein the adsorbent of the adsorbent media bed comprises a sodium titanate adsorbent or a silicotitanate adsorbent.

15. The water purification system of claim 8 wherein the adsorbent media bed further comprises adsorbents for adsorbing mercury, arsenic, iodine or mixtures thereof.

16. The water purification system of claim 8 further comprising a disinfectant dispenser in fluid communication with the potable water reservoir.

17. The water purification system of claim 16 wherein the disinfectant dispenser is a hydrogen peroxide-generating unit.

18. A water purification system comprising:
a non-potable water reservoir;
a low pressure pump, the low pressure pump being in fluid communication with the non-potable water reservoir;
a heater, the heater being in fluid communication with the non-potable water reservoir;
a thermal hydrolysis catalytic reactor, the thermal hydrolysis catalytic reactor comprising a hydrolysis catalyst configured for hydrolyzing chemical warfare agents and thermally deactivating live biological agents and biotoxins in water without addition of oxidizing agents and wherein the thermal hydrolysis catalytic reactor is in fluid communication with the heater;
a recuperator configured to transfer heat from treated water exiting said thermal hydrolysis catalytic reactor to said non-potable water entering said thermal hydrolysis catalytic reactor;
an adsorbent media bed, the adsorbent media bed comprising an adsorbent configured for adsorbing radionuclides and wherein the adsorbent media bed is in fluid communication with the thermal hydrolysis catalytic reactor;
a high pressure pump, the high pressure pump being in fluid communication with the adsorbent media bed;
a reverse osmosis unit, the reverse osmosis unit being in fluid communication with the high pressure pump; and
a potable water reservoir, the potable water reservoir being in fluid communication with the reverse osmosis unit.

19. The water purification system of claim 18 wherein the non-potable water reservoir comprises an expandable bladder, the expandable bladder in liquid communication with the heater and a decontaminated water reservoir, the decontaminated water reservoir in liquid communication with the adsorbent media bed and the reverse osmosis unit.

20. The water purification system of claim 18 further comprising a filter screen and an inlet filter in liquid communication with the non-potable water reservoir.

21. The water purification system of claim 20 wherein the filter screen comprises a mesh of from about 1 mm to about 3 mm and wherein the inlet filter comprises a mesh of from about 5 μm to about 50 μm.

22. A portable water purification system comprising:
a non-potable water reservoir, the non-potable reservoir comprising an internal expandable bladder and a decontaminated water reservoir;
a low-pressure pump, the low-pressure pump being in fluid communication with the expandable bladder of the non-potable water reservoir;
a recuperator, the recuperator being in liquid communication with the expandable bladder of the non-potable water reservoir and configured to transfer heat thereto;
a heater, the heater being in fluid communication with the recuperator;
a thermal hydrolysis catalytic reactor, the thermal hydrolysis catalytic reactor comprising a hydrolysis catalyst and wherein the thermal hydrolysis catalytic reactor is configured to hydrolyze chemical or biological contaminants in water, without addition of an oxidant and is in fluid communication with the heater and the recuperator;
said recuperator being configured to transfer heat to non-potable water, exiting the expandable bladder prior to being heated with the heater, from heat in treated water exiting the thermal hydrolysis catalytic reactor;
an adsorbent media bed, the adsorbent media bed comprising a sodium titanate or silicotitanate adsorbent and wherein the adsorbent media bed is in fluid communication with the recuperator and the decontaminated water reservoir of the non-potable water reservoir;
a high pressure pump, the high pressure pump being in fluid communication with the non-potable water reservoir;
a reverse osmosis unit, the reverse osmosis unit being in fluid communication with the adsorbent media bed and the non-potable water reservoir;
a potable water reservoir, the potable water reservoir being in fluid communication with the adsorbent media bed; and
a disinfectant dispenser, the disinfectant dispenser being in fluid communication with the potable water reservoir.

23. The water purification system of claim 22 wherein the non-potable water source is a stream, pond, river or well.

24. A water generation and purification system comprising:
a gas stream production unit;
a water separation unit, the water separation unit disposed downstream from the gas stream production unit;
a first recuperator configured to transfer heat from water exiting said water separation unit; and
a water purification unit, the water purification unit comprising:
a non-potable water reservoir in fluid communication with the water separation unit, the non-notable water reservoir being connected to the water separation unit to receive water separated from the gas,
a heater, the heater being in fluid communication with the reservoir,
a thermal hydrolysis catalytic reactor, the thermal hydrolysis catalytic reactor comprising a hydrolysis catalyst and wherein the thermal hydrolysis catalytic reactor is in fluid communication with the heater,
a second recuperator configured to transfer heat from water exiting said thermal hydrolysis catalytic reactor to water entering said thermal hydrolysis catalytic reactor;
an adsorbent media bed, the adsorbent media bed comprising an adsorbent configured for adsorbing more than 99% of radionuclides in a fluid flowing therethrough and wherein the adsorbent media bed is in fluid communication with the thermal hydrolysis catalytic reactor, and
a reverse osmosis unit, the reverse osmosis unit being in fluid communication with the adsorbent media bed and a potable water reservoir, the potable water reservoir being in fluid communication with the adsorbent media bed.

25. The water generation and purification system of claim 24 wherein the gas stream production unit comprises a catalytic particulate filter.

26. The water generation and purification system of claim 24 wherein the water separation unit comprises a water separator.

27. The water generation and purification system of claim 24 wherein the water separation unit comprises a condenser and a refrigeration unit, wherein said refrigeration unit comprises a vapor cycle system, an air cycle system, an ambient air cooling system, a cooling tower or an absorption cooling system.

28. The water generation and purification unit of claim 24 wherein the water purification unit further comprises a low-pressure pump, the low-pressure pump being in fluid communication with the non-potable water reservoir and the heater and a high-pressure pump, the high pressure pump being in fluid communication with the adsorbent media bed and the reverse osmosis unit.

29. The water generation and purification system of claim 24 wherein the non-potable water reservoir comprises an internal expandable bladder and wherein the non-potable water reservoir is in further fluid communication with the adsorbent media bed and the reverse osmosis unit.

30. The water generation and purification system of claim 24 wherein the gas stream production unit comprises an engine in fluid communication with the water separation unit.

31. The water generation and purification system of claim 24 wherein the engine comprises a gas turbine engine, a gasoline engine or a diesel engine.

32. The water generation and purification system of claim 24 wherein the water generation and purification system is mounted in a vehicle.

33. A method for providing potable water comprising the steps of:
   providing a source of non-potable water, wherein the non-potable water contains one or more chemical or biological contaminants;
   heating the non-potable water to a temperature of at least about 125° C.;
   hydrolyzing the chemical or biological contaminants by passing the heated water through a thermal hydrolysis catalytic reactor, without addition of an oxidizing agent;
   cooling the treated water to less than about 100° F. by transferring at least a portion of the heat therein to the non-potable water prior to the heating step, with a recuperator;
   removing radionuclide contaminants by flowing the water through an adsorbent media bed; and
   pumping the water through a reverse osmosis filter to provide the potable water.

34. The method of claim 33 wherein the source of non-potable water is water generated from a gas stream.

35. The method of claim 33 wherein, in the heating step, the non-potable water is heated to a temperature of from about 125° C. to about 200° C.

36. The method of claim 33 wherein the adsorbent media bed comprises a sodium titanate adsorbent.

37. The method of claim 33 further comprising the steps of storing and disinfecting the potable water.

38. The method of claim 37 wherein the potable water is disinfected by adding hydrogen peroxide, hypochlorite or iodine.

39. The method of claim 33 wherein the water is pumped through the reverse osmosis filter unit at a pressure of from about 800 psi to about 1000 psi.

40. The method of claim 33 further comprising the step of storing the non-potable water in a non-potable water reservoir before the step of heating the non-potable water.

41. A method for providing potable water comprising the steps of:
   providing a source of non-potable water containing chemical or biological contaminants;
   storing the water in an expandable bladder of a non-potable water reservoir;
   pumping the non-potable water under low pressure from non-potable water reservoir;
   heating the non-potable water to a temperature of from about 125° C. to about 200° C.;
   hydrolyzing chemical or biological contaminants in the non-potable water by passing the heated water through a thermal hydrolysis catalytic reactor;
   cooling the treated water exiting the reactor to less than about 100° F. by transferring at least a portion of the heat therein, with a recuperator, to the non-potable water before the step of heating the non-potable water;
   removing radionuclide contaminants by flowing the water through an adsorbent media bed, thereby producing decontaminated water;
   storing the decontaminated water in a decontaminated water reservoir of the non-potable water reservoir, wherein the decontaminated water reservoir is outside of the expandable bladder;
   pumping the decontaminated water under high pressure through a reverse osmosis filter to provide the potable water; and
   storing the potable water in a reservoir.

42. The method of claim 41 wherein the low pressure for pumping the non-potable water is from about 40 psi to about 50 psi.

43. The method of claim 41 wherein the high pressure for pumping the decontaminated water is from about 800 psi to about 1000 psi.

44. The method of claim 41 wherein the adsorbent media bed comprises a sodium titanate or a silicotitanate adsorbent.

* * * * *